(12) United States Patent
Racuya-Robbins

(10) Patent No.: US 8,359,275 B2
(45) Date of Patent: Jan. 22, 2013

(54) SYSTEM FOR KNOWLEDGE CREATION

(76) Inventor: Ann Racuya-Robbins, Espanola, NM (US)

( * ) Notice: Subject to any disclaimer, the term of this patent is extended or adjusted under 35 U.S.C. 154(b) by 323 days.

(21) Appl. No.: 12/599,346

(22) PCT Filed: Jul. 24, 2007

(86) PCT No.: PCT/US2007/062466
§ 371 (c)(1),
(2), (4) Date: Nov. 9, 2009

(87) PCT Pub. No.: WO2008/073506
PCT Pub. Date: Jun. 19, 2008

(65) Prior Publication Data
US 2011/0004482 A1   Jan. 6, 2011

(51) Int. Cl.
*G06Q 20/00* (2012.01)
(52) U.S. Cl. .................................. 705/300; 705/1.1
(58) Field of Classification Search ............ 705/1.1, 705/300
See application file for complete search history.

(56) References Cited

U.S. PATENT DOCUMENTS

| | | | | |
|---|---|---|---|---|
| 2001/0032189 | A1* | 10/2001 | Powell | 705/59 |
| 2002/0002524 | A1* | 1/2002 | Kossovsky et al. | 705/36 |
| 2002/0095302 | A1 | 7/2002 | Moriwaki | |
| 2004/0186738 | A1* | 9/2004 | Reisman | 705/1 |

OTHER PUBLICATIONS www.wkbank.com any date retrieved from archive.org anylinkage Feb. 5, 2005.*

* cited by examiner

*Primary Examiner* — Traci Casler

(57) ABSTRACT

In order to establish a system that maximizes the creation and benefits of human knowledge for the most people, including the wealth knowledge generates, the nature of the knowledge creation process itself must be understood and embedded in the system. The invention is the system for enabling knowledge creation and the wealth knowledge generates in which participants retain ownership to his or her knowledge and most of the wealth the knowledge generates.

18 Claims, 3 Drawing Sheets

SYSTEM FOR KNOWLEDGE CREATION

The present invention is the system designed specifically to enable knowledge creation, where a user who creates the knowledge retains ownership and control of that knowledge, as well as most of the revenues generated by that knowledge. The system is a democratically self-governing and peaceful way to share, exchange, market, distribute, and broadcast a user's knowledge.

Today we live in a world where people's quality of life and health varies greatly across the globe. Some people have extraordinary privilege while others have less than is needed to survive. There is a sense in our world that a scarcity exists in both resources and possibilities of a good life for many.

This disparity in people's quality of life can be indexed to the kind of work a person does and how a person is rewarded for his or her work. The value of a person's work is measured largely by how much money a person is paid for her or his time.

When great disparities exist in who has her or his needs and wants satisfied, a general sense of injustice and the experience of poverty emerges for many. This sense of injustice and experience of poverty is not a matter of ideology but something that emerges from a sense of our common humanity. It is a kind of common sense. The invention exposes the realization that neither scarcity nor injustice are a clear picture of life but are limitations created by how people have organized themselves. The invention is an alternate and improved way of organizing ourselves for the creating and sharing of knowledge and the wealth knowledge creates, based on valuing more kinds of knowledge from more people resulting in a greater. sense of abundance and justice for many more people.

In our current world, knowledge is often hidden or hoarded. This hiding or hoarding occurs because today owning certain kinds of knowledge is central to the creation of wealth and people's livelihood. Quite naturally then, people feel the need to hide, obfuscate and hoard knowledge. Further the knowledge creation process is often unjustly exploited by people other than those who created the knowledge and to the financial detriment of the person who created the knowledge. This current system breeds distrust and to a certain extent isolation and loneliness, a sense of being disconnected from each other. This sense of isolation, of being unappreciated and distrustful of others, seems the price of much of contemporary life. This kind of world does not support nor is it conducive to the knowledge creation process, except for a relative few. Today, for the vast majority of people on the earth, the chances are greatest that the things we know and have to share will not be heard or valued but by a few, if that.

Until the present invention, no system has existed to provide a secure, democratically self-governing and efficient marketplace for a user to justly exchange, and build on other user's knowledge about a broad range of knowledge subjects including knowledge from life experience and especially about how to live, while receiving most of the wealth that knowledge creates.

While variation in how people's time is valued is a natural consequence of individual differences, great disparities among how people's time is valued leads to poverty for many and is counter productive to increasing the wealth of the world and the equitable distribution of that wealth brought to the human community by each and every life. Currently, people whose time is apparently more valuable are likely to have more resources to support his or her life than other people. A person whose time is not valued is likely to have a restricted life and health and his or her knowledge is likely to be lost to others because that person is likely to be overlooked, ignored and even die sooner.

Today, even for the few whose life has better quality, much of his or her knowledge is lost because only a select set of life activities are currently valued. Systems that value some people's knowledge and life activities while ignoring or not valuing other people's knowledge cannot see nor develop the abundance of wealth from knowledge. It is arbitrary and an oversight to decide that some people's knowledge is not valuable when you don't know what that knowledge is. Such systems increase and exacerbate poverty for many and restrict and are not optimized to enable knowledge creation and the wealth knowledge generates.

Some governments are more dedicated than other governments to increasing all peoples' participation in the current highly competitive system and these governments are democratic and are the preferred emergence ground for the invention.

The invention is the system, subsystems, methods, processes, devices, apparatus, techniques, and computer and software applications for implementing the system, to overcome the above problems.

An advantage of the invention is that the vast majority of people on earth can use the invention to be rewarded for his or her knowledge by (including but not limited to) protecting a user's intellectual property rights and other rights explicitly protected by the self-governing invention's democratic Constitution and Bill of Rights and Responsibilities; and to receive revenues for a user's knowledge when a user shares or sells a user's knowledge through the invention's Marketplace.

Another advantage of the invention is that by being democratically self-governing of its interaction with global communication networks and infrastructure, including but not limited to the internet, mobile telecommunication services and the World Wide Web, the invention can provide an efficient, secure, safe, practical and just system that enables and amplifies knowledge creation and wealth generation for its users.

An object of the invention is to provide a system, and subsystems including methods, processes, devices and apparatus, databases, computer subsystems and software and communication applications, that are characterized by the stated independent claims. The preferred embodiments of the invention are disclosed in the dependent claims.

The invention is based on the realization that every activity a person does creates knowledge and that sharing knowledge from life activities amplifies the total knowledge created, and often in unexpected ways.

This realization—that every activity a person does creates knowledge and that sharing knowledge from life activities amplifies the total knowledge created, and often in unexpected ways—is an expression of three key insights into the process of knowledge creation. They are: 1. doing a life activity creates emergent/new knowledge of life activities, and 2. knowledge sharing is a central method of creating and amplifying the benefits and rewards of knowledge. 3. just and fair sharing is the best way to amplify the benefits and rewards of knowledge creation for the most people.

The invention is based on the realization that the best environment for knowledge creation and wealth generation is a system that is democratically self-governed, globally accessible through communications networks such as the internet and the World Wide Web among others and that is just, secure, safe, equitable and generous. The above named insights (conceptualizations) enable us to see better how the invention is best suited to enabling knowledge creation and the wealth that can be generated from the knowledge.

An advantage of the invention is that, it is a democratically self-governing system that by valuing more people and the knowledge from more life activities, increases the amount of wealth generated and provides a more just system for wealth distribution.

The invention, for the first time, provides a democratic self-governing, creative, just, secure, fun, and fast system wherein millions of people can work together to solve problems, and receive a new form of revenue while creating new opportunities for life on earth.

In the following the invention will be described in greater detail by means of preferred embodiments and with reference to the accompanying drawings, in which.

Figure 1:
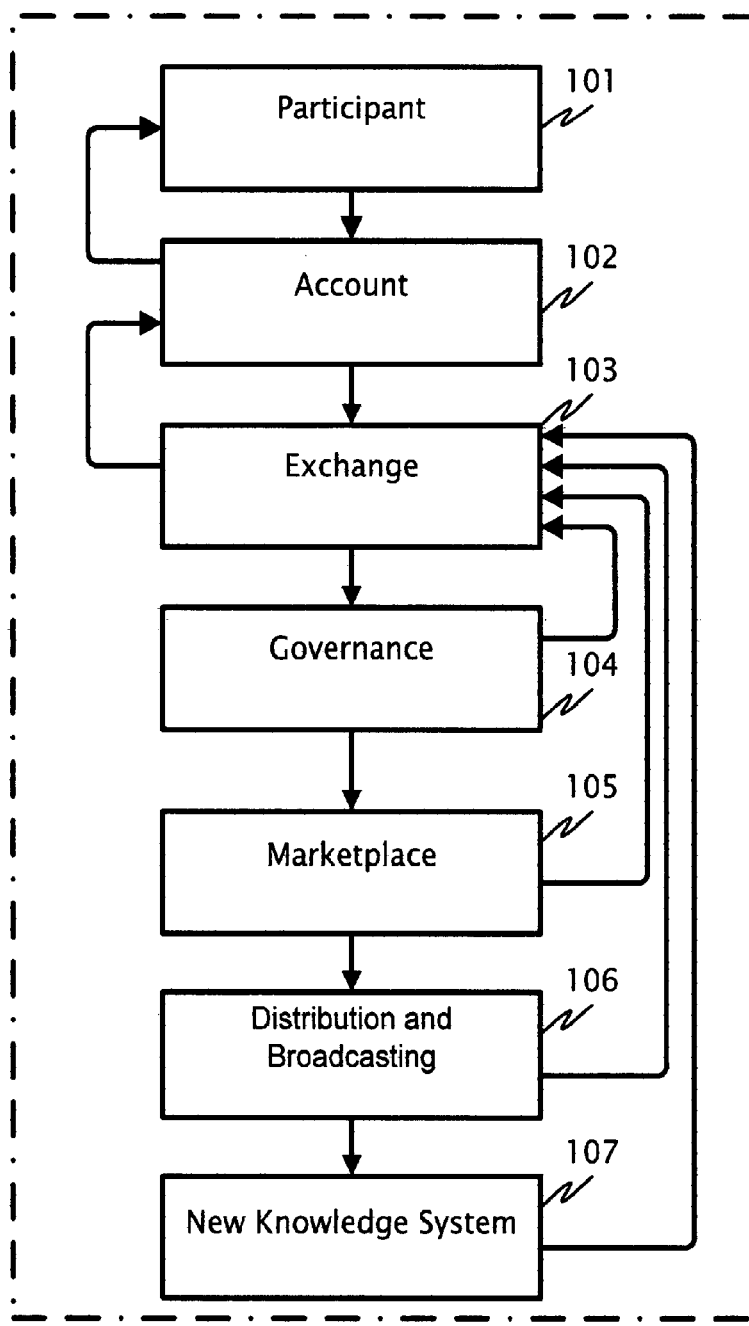
FIG. 1 illustrates a simplified exemplary embodiment of the invention.

The present invention is applicable for any kind of knowledge creation and wealth generation from that knowledge, except knowledge that destroys or ends life.

The present invention establishes a system that is democratically self-governing, global and self-sustaining including subsystems, organizational infrastructures, processes, methods, devises, techniques and apparatus, including internet facilitated computer subsystems and software programs, computer architecture including database architecture and management subsystems, governance subsystems and justice subsystems for knowledge creation, knowledge recording and the equitable sharing of knowledge available over the internet and the World Wide Web.

In the following, the present invention is described by using as a simplified example, a system that enables and supports knowledge creation and wealth generation from knowledge about daily life where the invention may be applied, without restricting the invention to knowledge about daily life, however.

To see how the invention works in the example a specific piece of knowledge about daily life has been chosen, namely, knowledge about how a person found the right temperature for drinking tea while not burning her or his fingers or tongue. The specific example of knowledge about daily life follows:

One day user R decides to try drinking tea (ref. 201) instead of coffee first thing in the morning because R has been having trouble with too much stomach acid in the morning. R who lives in Santa Fe, N. Mex., USA, in the mountains at 7000 feet of elevation, discovers that R likes drinking tea. R has already opened an account (ref. 102 and ref. 302) in the Account subsystem (hereafter Account) with the System for Knowledge Creation.

On Jun. 5, 2006 R deposits (ref. 203) the following knowledge into R's account (ref. 302):

"... I fill my cup with water and put it in the microwave for 1 minute 35 seconds and then put my tea bag in to steep while I prepare my breakfast. . . . I chose to microwave rather than boil the water because it is faster and when I boiled the water, I always wanted to take a sip of tea too soon and burned my tongue. But when I microwave the water, the cup gets too hot and I often burn my fingers because the cup takes too long to cool down and I don't want to hold my cup with a pot holder.

This morning I used a cup I had never tried before. When I reached into the microwave after heating, I could tell the cup was not too hot to touch and when I tested the water with my finger the temperature was just right. I sat down and drank my tea with my breakfast. This brought a smile to my face and made the start of my day much better. I wondered why this cup didn't get too hot and one thing I noticed was that the handle had a different shape, with a place for your thumb that lifted up and away from the rest of the handle. While I am not sure this shape to the handle is the reason the cup was not too hot I do now know that the right cup makes a big difference and that it is possible to find the right temperature for drinking tea that is fast and allows me to use the microwave. I would like to explore this discovery more. Ever since I discovered this I have wanted to share this simple discovery that made a big difference in my day."

R decides to title the knowledge deposit "Finding the right temperature for drinking tea." When R saves the deposit the knowledge goes to the Exchange subsystem (hereafter Exchange) (ref. 103) in FIG. 1, where it is logged and returns a receipt to R's account (ref. 102) in FIG. 1 for R's knowledge as recorded and deposited on Jun. 5, 2006.

R then decides to find out if R can generate revenues from R's deposited knowledge, "Finding the right . . . " R browses over the internet the "Calls for Knowledge of Daily Life" database, (ref. 105) in FIG. 1, in the Marketplace subsystem, (hereafter Marketplace) where a user can list requests for knowledge on a variety of aspects of daily life. R's browsing and searching details are logged in the Exchange (ref. 103) and the browsing and searching details are returned via receipt to R's account in the Account (ref. 102) in FIG. 1.

After browsing and searching R still doesn't find any requests for "Finding the right . . . " in the "Calls for Knowledge" section of the Marketplace (ref. 105) in FIG. 1. R then decides to post "Finding the right . . . " in the "Knowledge Available" section of the Marketplace (ref. 105). R's decision to post R's knowledge to the Marketplace is logged in the Exchange (ref. 103) which is governed by Governance subsystem (hereafter Governance) (ref. 104) in FIG. 1 including the system's Constitution and Founding Principles and the policies, rules and remedies in the system's "Dispute Resolution subsystem". A receipt is sent to R's account (ref. 102) in the Account. R now has many options. Among R's options R can decide to float a price or the knowledge and/or find out how many people record an interest in R's "Finding the right . . . " in the "Knowledge Available" section of the Marketplace.

R decides to find out how many people record an interest. R's request to find out how many people record an interest is logged in the Exchange (ref. 103) and a receipt with the decision particulars is sent to R's account in the Account (ref. 102).

One day later, on Jun. 6, 2006 a message is sent from the Exchange (ref. 103) to R's account (ref. 102) in the Account that 150 people are interested in finding out about R's knowledge. R decides to price R's knowledge at $0.50 per view. 100 people decide to purchase a view of R's knowledge. The particulars of the offer, agreement and purchase are logged into the Exchange (ref. 103) and a receipt with the particulars is returned to R's account (ref. 102). By logging and receiving receipts in R's account (ref. 102), R's ownership in the chain of knowledge transactions is documented and secured. The buyer's money is put into an escrow-like place in the Exchange (ref. 103) and delivered (ref. 208) to R's account (ref. 102) as the buyers view the knowledge. In one day R receives $50.00 for R's knowledge. All of the aspects of the transaction are self-governed by the system and are securely and safely kept. R receives $50.00 for the knowledge "Finding the right . . . " as recorded and deposited on June 5 in R's account (ref. 102). This knowledge had no recognized market, nor monetary value, previously.

Both buyers and sellers are knowledge contributors to the System for Knowledge Creation and all have accounts (ref. 102) where his or her activities are logged and documented. This logging through the Exchange (ref. 103) forms the basis for dispute resolution and establishing better and more just mechanisms of the system's self-governance.

R can continue to make decisions about the marketing, development, distribution and broadcasting of R's knowledge "Finding the right . . . . For example R can decide to add a picture of the cup for $0.10 per view. All R's decisions are logged in the Exchange (ref. 103) and returned via a receipt to R's account (ref. 102). All activities of the Exchange (ref. 103) are governed by the system's self-governance subsystem (ref. 104).

In the example above, R freely deposits his or her knowledge into the invention through an account (ref. 102). R is motivated to deposit his or her knowledge in order to receive revenues, although R can elect not to receive revenues but rather donate R's knowledge to the Invention's Public Library or someone else's account (ref. 102). R is also motivated to deposit her or his knowledge because R feels delight and excitement in discovering something R didn't know before and wants to share it with others. It is a common human experience to feel delight, excitement and wanting to share something he or she has discovered. All of these feelings can make R feel he or she has not only helped his or herself but has also made a contribution to others, leaving R with a sense of community and self worth and esteem.

One of the buyers (ref. 205) of R's knowledge "Finding the right . . . " is user S in FIG. 2. Here the implication can be seen clearly that the limits of knowledge creation are indexed to the number of users and length of their lifetimes (ref. 209). Systems, such as the invention, that protect and enhance life also protect and enhance knowledge.

Figure 2:
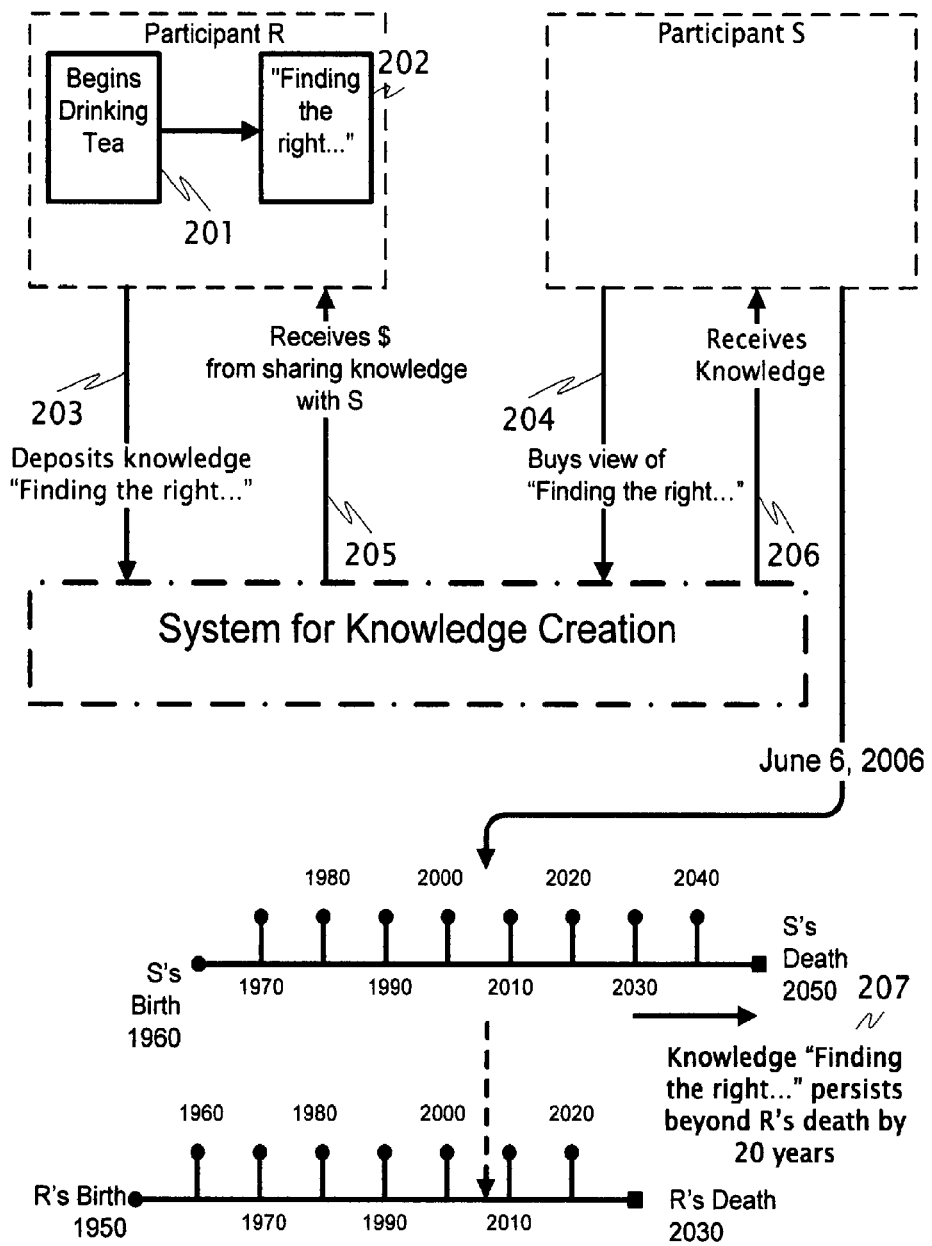
FIG. 2 shows a simplified exemplary embodiment of the key process and consequence of the invention with two users.

FIG. 2 represents the invention's central realization that any life activity contains the knowledge creation kernel which is that emergent/new life activities appear freely from living and reliving a life activity (ref. 201 and 202). While FIG. 2 shows that the emergent/new life activity, in this case "Finding the right . . . " (ref. 202) relates to the life activity R was doing—drinking tea—the emergent/new life activity may have related to a life activity about something else entirely. A very simple personal example of the emergent/new life activity related to a life activity about something else entirely is the experience many of us have had namely, that when watching or hearing something creative being done by someone our own ideas, often emergent/new and unrelated ideas are stimulated. Artists and writers, in general are familiar with this experience. This is a type of resonance principle that exists in the knowledge creation process when knowledge is shared.

The exact piece(s) of the emergent/new life activity(s) that is created and when it is created remain largely unknown. For the purpose of the present invention it is enough to know that emergent/new life activity is integral to the knowledge creation process itself.

Once created if the system within which it is created is just and democratically self-governing the emergent/new life activity is immediately available to be shared and used, built on or added to by each user and all users and yield revenues for users.

Every emergent/new life activity adds to the number and range of possible life activities available in the invention for users to use. When a person dies before sharing a person's knowledge, the "life" of that knowledge ends.

FIG. 2 illustrates that when R shares the knowledge "Finding the right . . . " through the invention (ref. 203), the knowledge "Finding the right . . . " persists at least twenty years beyond R's life (ref. 207).

Figure 3:
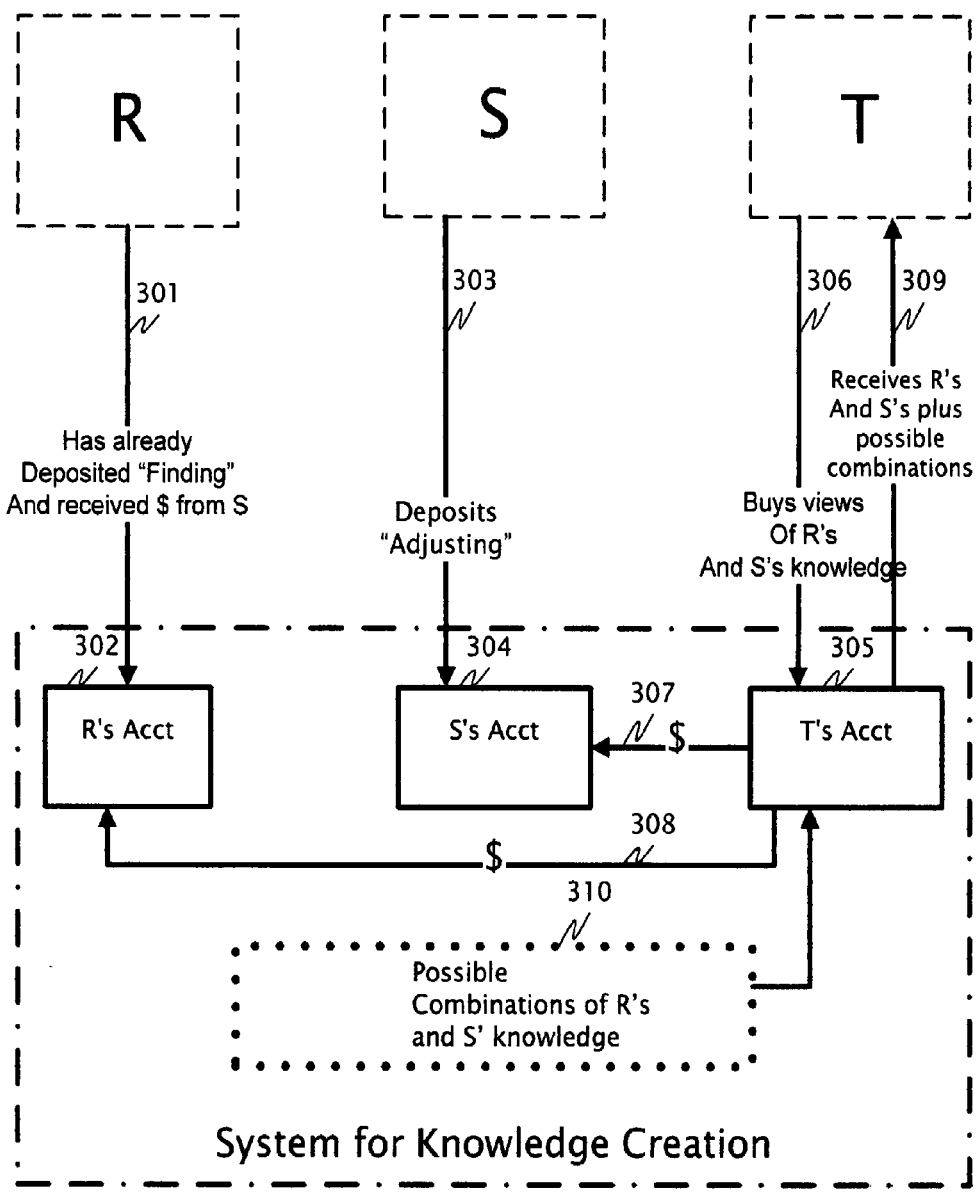
FIG. 3 shows a simplified exemplary embodiment of the invention with three users.

When the knowledge creation process is further shared and recorded with three users as in FIG. 3 of the invention, the total knowledge created "blooms" with a large number of variations or combinations of a life activity (ref. 312) and emergent/new life activities (ref. 301) and (ref. 306) made available to others. This blooming is expressed in FIG. 3 as possible combinations of the user R's and S's knowledge (ref. 312). It is the invention that creates and/or enables the combinations. The total knowledge created while dependent on R and S is no longer bounded by the lives of R and S that created it, but is now available in varying proportions for any user to use and benefit from. In this way the invention enables the knowledge created to exist until all life is dead.

In FIG. 3 R has already deposited "Finding the right . . . " and received revenue (ref. 301) from S's purchase of "Finding" in R's account (ref. 302) in the Invention. S has already received "Finding" in S's account (ref. 304).

In FIG. 3 user S, who lives in Rio de Janeiro, Brazil, at sea begins using "Finding the right . . . " but notices that the temperature is still too hot. S continues to experiment with R's "Finding the right . . . " and finds that the right temperature is achieved after microwaving for 1 minute instead of 1 min 35 seconds. S decides that the shorter heating heating time may be due to S residing at sea level. S titles S's discovery "Adjusting heating time for sea level" (ref. 304). While S is not sure the difference is due to residing at sea level, S decides to deposit S's discovery "Adjusting" into S's account (ref. 304) in the System of Knowledge about Daily Life.

User T in FIG. 3 also drinks tea and is interested in finding the right temperature. User T, who lives in Omaha, Nebr., USA, at 1187 feet of elevation, opens an account (ref. 305) with the System for Knowledge Creation about Daily Life to look for knowledge about finding the right temperature for drinking tea using a microwave. T decides to buy a view of R's "Finding the right . . . " and S's "Adjusting heating time for sea level" (ref. 306). S receives revenues from T in S's account (ref. 307). R receives T's revenue in R's account (ref. 308). Surprisingly. T not only receives R's and S's knowledge (ref. 309) but T also receives possible combinations or mixes (ref. 310) of R's knowledge and S's knowledge. Here the amount of knowledge created is much greater than R's and S's knowledge alone.

In FIG. 3 it is possible to see that the more users there are in the invention the more knowledge the invention will enable to be created and at an unprecedented speed.

FIG. 3 is an example of knowledge from one life activity shared by three users which creates an abundance of possible combinations that can be used. Today the earth has 6 billion people, most of whom are eligible to participate in the invention.

Because emergent/new life activities arise freely and naturally in the knowledge creation process there is no need to force its appearance. While discipline and other methods may increase the likelihood of emergent/new life activities' appearance it is not necessary. Emergent/new life activity is an expression of a person living freely and naturally and a person's need and will to survive.

In order to build the system, the first step is to create the Governance subsystem. Without a strong and just Governance subsystem, stealing, hiding, hoarding and obfuscating can flourish unchecked and limit the invention's capacity to generate knowledge and wealth for the greatest number of users. Further the invention's Governance subsystem begins by establishing Founding Principles and a Constitution. The invention's founding Governance subsystem is illustrated in a preferred exemplary description of the Governance subsystem as described below.

The Constitution of the Invention

Declaration of the Establishment of the Invention

The invention is established to create a vibrant and just community wherein all users can share their knowledge about daily life and elect to be compensated for what they know.

The invention's ability to make this Declaration is due to the democratic and just qualities of the Constitution of the United States of America and the just qualities of the development of the United States of America over time. Further the invention's creation and development stands on the shoulders of:

- the native people of the Americas including the Iroquois Confederacy that first established democratic practices here
- the native people who handed down to current generations the beauty of the Americas' land
- and the Great Giving (please see The Constitution of Mercy forthcoming) of the countless named and unnamed men and women from around the world that have spent their lives in support of the living earth, justice for all and the power of the free human spirit.

Founding Principles

The invention holds as self evident that:
- the knowledge of life is the essential labor of every life.
- every life has an inalienable right to and responsibility for its knowledge.
- every life has a right to revenues generated through or from the shared use of its knowledge.
- all life encodes in its unique signature an intrinsically creative insight into living.
- the world is bountiful with human creativity.
- the greatest value of creativity is reached when it is shared in a respectful and just manner.
- democracies and institutions within democracies are living entities that can and must grow, change and refine themselves in order to create more just, compassionate and free societies.
- no life should end without its legacy being valued and that each life develops knowledge that is irreplaceable and needed by the human community.
- every life has its knowledge and that taken together all this life knowledge is a most powerful force for good in the world.
- every user in the invention must tell the truth.
- the invention is held to the same standards and rules of conduct as a user.
- no user should steal or help another user, person or entity to steal other user's knowledge.
- the protection of children's knowledge and general well being up until the age of majority is among the highest responsibilities of every user.
- the appreciation of creativity and creative acts in oneself and others stimulates more creativity in oneself and in others.
- the safety and security of users' and the invention's knowledge is a shared responsibility. That the invention is responsible for making good faith efforts to ensure the safety of the invention's systems and a user is responsible for making good faith efforts to secure the access of a user to the invention.
- this list holds the seeds and the promise of the invention's ultimate unfolding.

Preamble

The invention is governed by the laws of the United States of America and the treaties to which the US is a signatory. Further the invention is governed by its own democratic Constitution, Bill of Rights and Responsibilities and System of Justice that the invention that will be evolving, amending and restructuring from time to time.

Article I

Amending the Constitution

Upon completion of the invention's Constitution approximately 5 years after the invention's creation the Constitution will have in place democratic procedures and mechanisms for amending and improving itself, establishing policies, rules and regulations. While the list of Founding Principles of the invention may not yet be complete the principles articulated under Founding Principles cannot be removed from the Constitution.

The Constitution will include compassionate, brave and just methods and mechanisms of enforcement and remedies for abuse of its Constitution, stated Founding Principles, rights, responsibilities, policies, rules and regulations. The invention will build on the wisdom and traditions from around the world.

Article II

Dissolving and Transforming the Invention

Upon completion of the invention's Constitution, the Constitution will have in place a set of rules for the orderly dissolution and transformation of the invention if the invention ceases to be a force for good in the world.

Article III

System of Justice

Section I Judicial Power (To develop, administer and adjudicate a set of rules of user conduct based on User's Rights and Responsibilities.)

Section II Enforcements

Random audits of the Exchange logs
Supervised analysis of the Exchange logs
Person(s) responsible for the Exchange are elected

Section III Remedies

To Begin—a simple set of consequences.

Article IV

User's Rights and Responsibilities

Section I User's Rights

A user owns the knowledge in a user's account.

A user can make, and in some cases must make decisions about a user's knowledge including:
- how, if at all, to assign the rights to a user's knowledge
- how to pass on the rights to a user's account
- if and how to have a user's knowledge distributed on the system's Distribution and Broadcasting subsystem FIG. 1 (ref. 106)
- how to display a user's knowledge in a range of display formats offered to a user by the invention possibly including new display formats suggested by a user.
- how and when to add and/or edit the knowledge in a user's account
- when to close a user's account with the invention.
- A user has the right to invoke the Dispute Resolution subsystem of the invention, where the ability to pay legal fees is equalized such that a user with greater financial resources can not unjustly prevail over users with fewer financial resources.
- electing the person(s) responsible for the Exchange.
- That this list holds the seeds and the promise of the invention's ultimate unfolding.

Section II User's Responsibilities

A user is accountable for attesting truthfully that a user is:
- the originator of knowledge in a user's Account
- the owner of knowledge in a user's Account
- has not assigned a user's rights before depositing a user's knowledge in the invention.
- not the owner but has been assigned the rights to this knowledge by someone-else
- not reporting on a third party conversation where a user was not present
- may be contacted at the location given to the invention
- is not depositing illegal content in the invention including Child Pornography, Defamatory or Libelous speech.
- is not depositing adult pornography. As to pornography the decision of the invention is in its sole and absolute discretion is final.
- is not contributing content for violent or terrorist purposes and/or is not encrypting or obfuscating violent or terrorist knowledge in order to deposit and transfer this knowledge through the invention.
- is not depositing any form of malware, including viruses, worms and new forms.
- In case of disputes, a user will use the invention's Dispute Resolution Subsystem.
- electing the person(s) responsible for the Exchange.
- That this list holds the seeds and the promise of the invention's ultimate unfolding.

After creating the Governance subsystem FIG. 1 (ref. 104) the invention needs to create the Exchange subsystem FIG. 1 (ref. 103) where information about the invention and a user's interaction with the invention are recorded and returned to that same user. In this way a user retains an interest in and access to how the system is recording and sharing a user's knowledge (including the Account subsystem FIG. 1 (ref. 102) Governance subsystem FIG. 1 (ref. 104), Marketplace subsystem FIG. 1 (ref. 105) and Distribution and Broadcasting subsystems FIG. 1 (ref. 106) when they have been built).

Next the secure Account subsystem and then the Marketplace subsystem FIG. 1 (ref. 105) is created.

The next step is to provide a media-rich way to distribute and broadcast a user's knowledge through the Distribution and Broadcasting subsystem See FIG. 1 (ref. 106). The number and richness of the ways in which a user's knowledge is distributed allows greater amplification of the wealth generating capacity of the knowledge.

The last step is to review what the invention knows including about itself, in order to improve and innovate in the invention itself and in ways that are not expected through the New Knowledge subsystem. This New Knowledge subsystem is an opening or clearing left in the invention so the emergent/new is anticipated and welcomed when it arrives. See FIG. 1 (ref. 107).

In general, while extracting knowledge from the knowledge creation process, including emergent/new life activity may be possible the invention shows that not only is extraction without a user's informed consent not practical or just but it actually diminishes the freedom and privacy that created the knowledge in the first place.

In general, when one user attempts to take, or force the extraction of another user's knowledge, that first user is likely to feel violated, injured and reluctant or even outright refusing to participate in the extraction. Since the invention itself must abide by the Governance subsystem the invention is prohibited from extracting a user's knowledge without a user's informed consent. The invention provides a secure and just operating environment where a user can control the deposition, sharing, development, marketing, broadcasting and governance of his or her knowledge.

The invention embodies the most practical, fun, fast, efficient and just way to gather knowledge from the knowledge creation process and create the most wealth for its users.

The full description of the implications of the conceptualizations in the knowledge creation process in the invention lies beyond the scope of what is necessary to understand the present invention. The intention here is to lay the essential framework of conceptualizations of the knowledge creation process so that the invention can be more fully understood.

In summary, there are three principal limitations on how much knowledge can be created by a person. One limitation is the length of a person's life. The second is the number of life activities a person can do. The third limitation is somewhat unexpected and is how much knowledge a person is able to justly share. In this way knowledge sharing becomes a central aspect of knowledge creation and is highly favored, but not forced in the invention. In a common sense way sharing knowledge allows the knowledge to live on in others.

The invention addresses and rectifies injustices such as stealing, manipulating, tricking, overvaluing some knowledge and under or not valuing other knowledge or making it logistically and financially unfeasible for an individual to protect his or her rights. These injustices limits the amount of knowledge and wealth that a system can create.

Because the invention maximizes the wealth of the invention and for its users, and the invention's wealth is based on knowledge, more than materials and natural resources, the pressure on natural resources is diminished giving the earth a better chance to provide life essential resources for people. In fact in many cases the knowledge of something alone may be sufficient development of something.

Because the knowledge creation process is recognized and supported by the invention, the invention itself will become dramatically more creative and better able to support the knowledge creation process.

Because the invention supports, facilitates and amplifies knowledge creation through sharing, revenues generated are amplified and many more people are able to provide for themselves and others. In the invention a user involved in the knowledge creation process will increase his or her chances of surviving and flourishing. The full description of the implications of the invention lies beyond what is necessary to understand the invention. But these conceptualizations and the invention built on them exemplify a system through which a person's survival is improved when the group survives.

The invention claimed is:

1. An electronic-network based system for knowledge creation, said electronic-network based system comprising:

at least one computer processor account subsystem, Said at least one computer processor account subsystem having a plurality of user accounts;

at least one computer processor exchange subsystem;

at least one computer processor governance subsystem for governing activities of said at least one computer processor exchange subsystem; said at least one computer processor governance subsystem being a system self-governed through said plurality of said user accounts;

wherein said exchange subsystem is internetworked with said computer account system and said computer governance subsystem; and wherein said computer exchange subsystem is configured by said computer governance system to operate in accordance with said self-governing system to:

receive through each of said plurality of user accounts, an election of at least one person responsible for said computer exchange subsystem;

elect at least one person responsible for said computer exchange subsystem according to said received elections; receive first user's knowledge deposited through a first user account of said plurality of user accounts of said computer account subsystem;

receive a second user's offer for purchasing a view of said knowledge deposit, said offer being sent through a second user account of said plurality of user accounts of said computer account subsystem;

accept said second user's offer; and distribute said knowledge deposit view to said second user account of said plurality of user accounts of said computer account subsystem in exchange for receiving, from said second user's account, money revenue for purchases;

further comprising a Dispute Resolution subsystem, internetworked with said computer exchange subsystem; and wherein said exchange subsystem is further configured to:

log particulars of said second user's offer to purchase said view, said acceptance of said second user's offer; and said distribution of said purchased view to said second user account;

log a receipt of said particulars in at least one of said first user account and said second user account; and wherein said dispute resolution subsystem is configured to: resolve a dispute between user accounts based on said logged particulars and logged receipt in response to receiving input from at least one of said first user account and said second user account whereby the ability to pay legal fees is equalized such that a user with greater financial resources cannot unjustly prevail over users with fewer financial resource.

2. The system of claim 1, wherein said exchange subsystem is further configured to control distribution of said purchased knowledge deposit view received in said second user's account on a distribution system according to a first user decision input received from said first user account.

3. The system of claim 1, further comprising a computer marketplace subsystem operably connected to said computer exchange subsystem; wherein said computer marketplace subsystem is configured to:

receive account user requests for knowledge submitted to said computer market subsystem; and list said requests for knowledge for searching by said account users.

4. The system of claim 3, wherein said exchange subsystem is further configured to:

post said first user's knowledge on said computer marketplace subsystem for viewing by account users in response to a request for posting said first user's knowledge; said request being submitted through said first user account of said computer account subsystem;

record at least one account user interest in said first account user knowledge posting in response to receiving an interest input from said at least one account user;

determine from said record of at least one account user interest the number of account users interested in said first user knowledge posting; and send in a message said amount of interested account users for viewing by said first user account.

5. The system of claim 1, wherein said exchange subsystem is further configured to:

post a price for said second user viewing said first user account knowledge in response to receiving the price entered through said first user's account;

receive said second user's offer for purchasing a view of said knowledge deposit at said posted price;

accept said second user's offer in accordance with an agreement governed by said computer governance subsystem; wherein said computer governance subsystem is a system democratically self-governed through said plurality of said user accounts;

receive revenue at said posted price in an escrow place in said exchange subsystem; and deliver said revenue at said posted price from said escrow place to said first user's account in response to distributing said knowledge deposit view to said second user account.

6. The system of claim 1, wherein said exchange is further configured to:

receive second user's knowledge deposited from said second user's account, wherein said second user's knowledge comprises adjustments made to said first user's knowledge; and wherein said exchange is further configured to:

receive a third user's offer for purchasing a view of said second user's knowledge deposit; said third user's offer for purchasing said view of said second user knowledge deposits being sent from said third user account; and accept said third user's offer for purchasing said second user knowledge deposits and distribute said combination deposit view to said third user account in exchange for receiving, from said third user account, money for purchasing said combination deposit view.

7. The system of claim 1, wherein said exchange is further configured to:

receive second user's knowledge deposited from said second user's account, wherein said second user's knowledge comprises adjustments made to said first user's knowledge; and wherein said exchange is further configured to:

receive a third user's offer for purchasing a view of a combination of said first user's knowledge deposit and said second user's knowledge deposit; said third user's offer for purchasing said combination view of said first and second user knowledge deposits being sent from said third user account; and accept said third user's offer for purchasing said combination view of said first and second user knowledge deposits and distribute said combination deposit view to said third user account in exchange for receiving in said first user account and said second user account, from said third user account, revenue for purchasing said combination deposit view.

8. A method implemented in an electronic-network based system for knowledge creation, said method comprising:
configuring a computer exchange subsystem to operate in accordance with a self-governing system of a computer governance subsystem for governing activities of a computer exchange subsystem internetworking said computer account subsystem and said computer governance subsystem; said self-governing system being configured through a plurality of user accounts of said computer account subsystem;
receiving through each of said plurality of user accounts, an election of at least one person responsible for said computer exchange subsystem;
electing, utilizing said computer exchange subsystem, at least one person responsible for said computer exchange subsystem according to said received elections;
receiving in said computer exchange subsystem first user's knowledge deposited through a first user account of said plurality of user accounts;
receiving in said computer exchange subsystem a second user's offer for purchasing a view of said knowledge deposit, said offer being sent through a second user account of said plurality of user accounts of said computer account subsystem;
accepting in said computer exchange subsystem said second user's offer; and
distributing from said computer exchange subsystem said knowledge deposit view to said second user account of said plurality of user accounts of said computer account subsystem in exchange for receiving in said first user's account from said second user's account, money for purchase of said view;
further comprising logging in said exchange subsystem particulars of said second user's offer to purchase said view; said acceptance of said second user's offer; and distribution of said purchased view to said second user account;
logging receipt of said particulars in at least one of said first user account and said second user account;
resolving through a dispute resolution subsystem of said computer system a dispute between user accounts based on said logged particulars and
logged receipt in response to receiving input from at least one of said first user account and said second user account whereby the ability to pay legal fees is equalized such that a user with greater financial resources cannot unjustly prevail over users with fewer financial resource.

9. The method of claim 8, further comprising:
receiving, in a computer marketplace subsystem operably connected to said computer exchange subsystem, account user requests for knowledge submitted to said computer market subsystem; and
listing in said computer exchange subsystem said requests for knowledge for searching by said account users.

10. The method of claim 8, further comprising
posting, using said exchange subsystem, a price for said second user to view said first user account knowledge, in response to receiving the price entered through said first user's account;
receiving, using said exchange subsystem, said second user's offer for purchasing a view of said knowledge deposit at said posted price;
accepting, using said exchange subsystem, said second user's offer in accordance with an agreement governed by said computer governance subsystem;
receiving revenue at said posted price in an escrow place in said exchange subsystem;
delivering said revenue at said posted price from said escrow place to said first user's account in response to distributing said knowledge deposit view to said second user account.

11. The method of claim 8, further comprising denoting, using said exchange subsystem, said first user knowledge to another user account or to an Invention's Public Library in response to receiving an entered input for denoting said first user knowledge to said another user account or Invention's Public Library.

12. The method of claim 8, further comprising
receiving in said exchange subsystem, said second user's knowledge deposited from said second user's account, wherein said second user's knowledge comprises adjustments made to said first user's knowledge; and
receiving in said exchange subsystem a third user's offer for purchasing a view of said second user knowledge deposit; said third user's offer for purchasing said view of said second user knowledge deposit being sent from said third user account;
accepting, using said exchange subsystem, said third user's offer for
purchasing said second user knowledge deposit view; and
distributing said second user knowledge deposit view to said third user account in exchange for receiving, from said third user account, revenue, for purchasing said second user knowledge deposit view.

13. The method of claim 8, further comprising receiving in said exchange subsystem second user's knowledge deposited from said second user's account, wherein said second user's knowledge comprises adjustments made to said first user's knowledge; and
receiving in said exchange subsystem from a third' user's account a third user's offer for purchasing a view of a combination of said first user's knowledge deposit and said second user's knowledge deposit; and
accepting in said exchange subsystem said third user's offer for purchasing said combination view of said first and second user knowledge deposits and distributing said combination deposit view to said third user account in exchange for receiving, from said third user account, revenue for purchasing said combination deposit view.

14. The method of claim 8, further comprising controlling, through said exchange subsystem, distribution of said purchased knowledge deposit view received in said second user's account on a distribution system according to a first user decision input received in said exchange subsystem from said first user account.

15. The method of claim 8, further comprising using a computer dispute resolution subsystem, internetworked with said computer exchange subsystem, to resolve disputes between said first and second users in accordance with dispute resolution rules and remedies stored on said computer dispute resolution subsystem;
wherein using said computer dispute resolution subsystem includes resolving through said dispute resolution subsystem a dispute between user accounts based on logged particulars and receipts in response to receiving input from at least one of said first user account and said second user account whereby the ability to pay legal fees is equalized such that a user with greater financial resources cannot unjustly prevail over users with fewer financial resource.

16. The method of claim 8, further comprising passing from said first user account to another user account assignment of rights to said first user's knowledge from said first user to said user account in response to a first user request from said first user account.

17. A computer program product comprising: a computer-usable data carrier storing instructions that, when executed by a computer, cause the computer to perform a method for knowledge creation, said method comprising:

configuring a computer exchange subsystem to operate in accordance with a self-governing system of a computer governance subsystem for governing activities of a computer exchange subsystem internetworking said computer account subsystem and said computer governance subsystem; said self governing system being configured through a plurality of user accounts of said computer account subsystem;

receiving through each of said plurality of user accounts an election of at least one person responsible for said computer exchange subsystem;

electing, utilizing said computer exchange subsystem, at least one person responsible for said computer exchange subsystem according to said received elections;

receiving in said computer exchange subsystem first user's knowledge deposited through a first user account of said plurality of user accounts; receiving in said computer exchange subsystem a second user's offer for purchasing a view of said knowledge deposit, said offer being sent through a second user account of said plurality of user accounts of said computer account subsystem;

accepting in said computer exchange subsystem said second user's offer; and distributing from said computer exchange subsystem said knowledge deposit view to said second user account of said plurality of user accounts of said computer account subsystem in exchange for receiving in said first user's account from said second user's account, money for purchase of said view.

18. The computer program product of claim 17, the method further comprising receiving in said exchange subsystem, said second user's knowledge deposited from said second user's account, wherein said second user's knowledge comprises adjustments made to said first user's knowledge; and receiving in said exchange subsystem a third user's offer for purchasing a view of said second user knowledge deposit; said third user's offer for purchasing said view of said second user knowledge deposit being sent from said third user account;

accepting, using said exchange subsystem, said third user's offer for purchasing said second user knowledge deposit view; and distributing said second user knowledge deposit view to said third user account in exchange for receiving, from said third user account, money for purchasing said second user knowledge deposit view.

* * * * *